(12) United States Patent  
Lu (10) Patent No.: US 6,697,049 B2
(45) Date of Patent: Feb. 24, 2004

(54) POINTING STICK WITH A RECTANGULAR-SHAPED HOLLOW STRUCTURE

(75) Inventor: Hsin-Yung Lu, Chu-Tung (TW)

(73) Assignee: Darfon Electronics Corp., Tao-Yuan Hsien (TW)

( * ) Notice: Subject to any disclaimer, the term of this patent is extended or adjusted under 35 U.S.C. 154(b) by 357 days.

(21) Appl. No.: 09/820,296

(22) Filed: Mar. 29, 2001

(65) Prior Publication Data

US 2001/0048424 A1 Dec. 6, 2001

(30) Foreign Application Priority Data

May 31, 2000 (TW) ........................................ 89110564 A (51) Int. Cl.⁷ .................................................. G09G 5/08
(52) U.S. Cl. ....................... 345/161; 345/156; 345/157; 345/158; 345/160; 345/169; 74/471 R; 341/34
(58) Field of Search ................................ 345/156, 157, 345/158, 160, 161, 169; 74/471 R; 341/34

(56) References Cited

U.S. PATENT DOCUMENTS

| 4,046,005 A | * | 9/1977 | Goroski ................... 73/862.05 |
| 5,541,622 A | * | 7/1996 | Engle et al. ................. 345/161 |
| 5,748,180 A | * | 5/1998 | Inukai ........................ 345/161 |
| 5,894,301 A | * | 4/1999 | Seffernick .................... 345/160 |
| 6,002,388 A | * | 12/1999 | Seffernick et al. ........... 345/161 |
| 6,353,431 B1 | * | 3/2002 | Poole et al. ................. 345/161 |
| 6,400,354 B1 | * | 6/2002 | Pin-Chien .................... 345/161 |
| 6,411,193 B1 | * | 6/2002 | Chen ........................... 338/47 |

* cited by examiner

Primary Examiner—Bipin Shalwala
Assistant Examiner—Vincent E. Kovalick
(74) Attorney, Agent, or Firm—Winston Hsu (57) ABSTRACT

A pointing stick device has a substrate, a rectangular-shaped hollow structure installed on the substrate having a central axis substantially vertical to the substrate, at least one strain gauge installed on the rectangular-shaped hollow structure, and a claw structure. The claw structure has at least one claw, and is used to impart a pressure onto the rectangular-shaped hollow structure and curve the rectangular-shaped hollow structure. When the claw of the claw structure imparts pressure on the rectangular-shaped hollow structure, the strain gauge distorts, following the curve of the rectangular-shaped hollow structure, to produce corresponding pointing signals.

7 Claims, 8 Drawing Sheets

POINTING STICK WITH A RECTANGULAR-SHAPED HOLLOW STRUCTURE

BACKGROUND OF THE INVENTION

1. Field of the Invention

The present invention provides a pointing device and, in particular, a pointing stick with a rectangular-shaped hollow structure.

2. Description of the Prior Art

Pointing devices are used to control the movement of a cursor on a computer monitor. They are widely used in all kinds of desktop and laptop computer peripherals, such as keyboards, mice, joysticks and remote controls.

Figure 1:
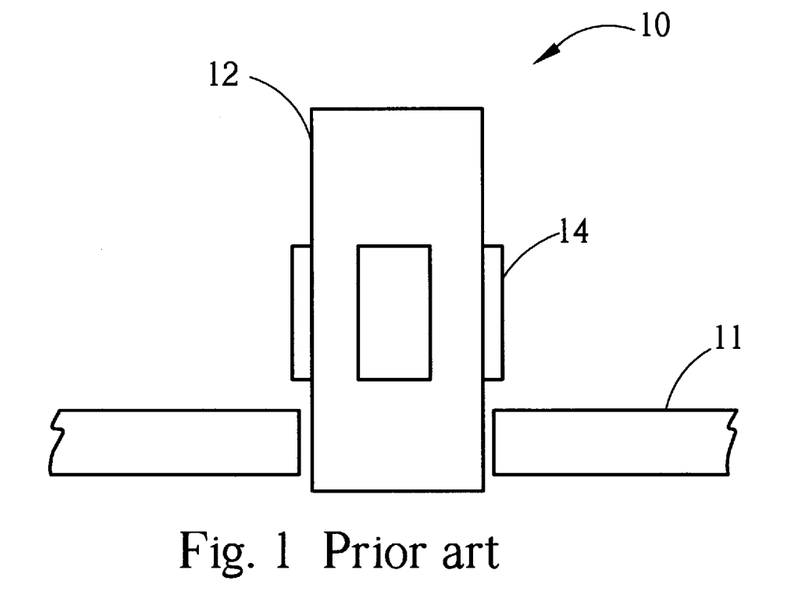
FIG. 1 is a schematic view of a prior art pointing stick device.

Please refer to FIG. 1, which is a schematic view of a conventional pointing stick device 10. The pointing stick device 10 comprises a substrate 11, a monolithic cylindrical stick 12 positioned on the substrate 11 to control the two-dimensional movements of the cursor on a computer monitor, and a plurality of strip strain gauges 14 installed at orthogonal positions around the stick 12 to measure pressure and generate corresponding pointing signals.

Figure 2:
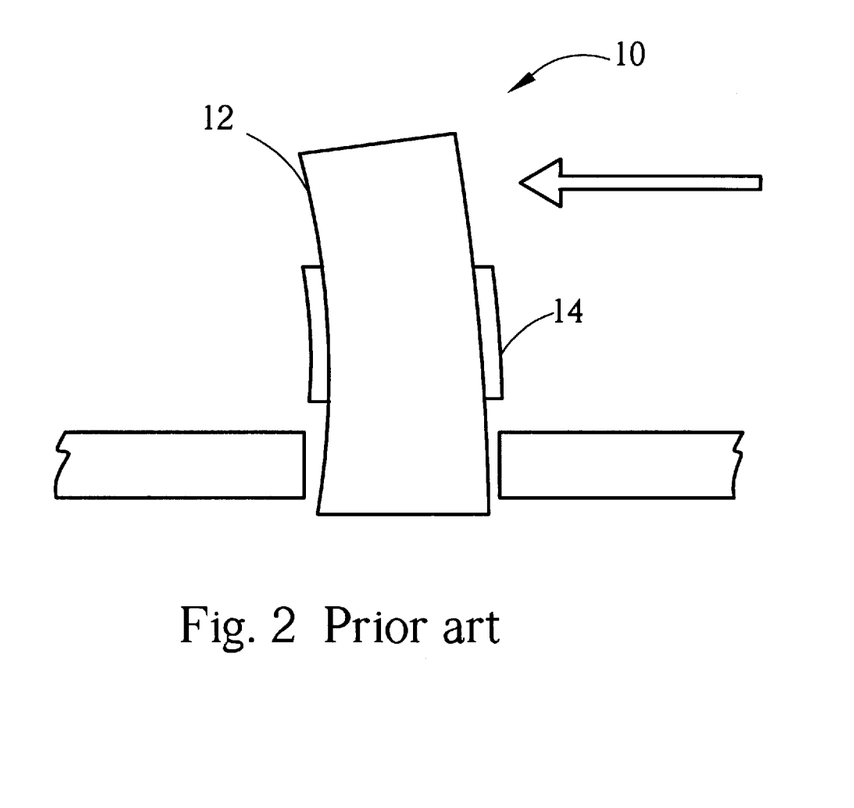
FIG. 2 shows schematically the pointing device in FIG. 1 under a force.

Please refer to FIG. 2, which shows schematically the pointing stick device 10 under a force. As shown in FIG. 2, when a horizontal external force is applied on the stick 12, the strain gauges 14 bend and distort along with the stick 12. The distortion of the strain gauges 14 generates the corresponding pointing signals.

However, the conventional pointing stick device 10 generates pointing signals using the strain gauges 14 that measure simply the bending of the stick 12. Therefore, the sensitivity of the strain gauges 14 is limited by the elasticity of the stick 12 and the strains generated due to bending. This makes it difficult to improve the sensitivity of the pointing stick device 10.

SUMMARY OF THE INVENTION

Consequently, it is a primary object of the present invention to provide a pointing stick with a rectangular-shaped hollow structure to overcome the above-mentioned defects.

Briefly, the present invention discloses a pointing stick device having a substrate, a rectangular-shaped hollow structure installed on the substrate and having a central axis substantially vertical to the substrate, at least one strain gauge installed on the rectangular-shaped hollow structure, and a claw structure. The claw structure has at least one claw, and is used to impart a pressure onto the rectangular-shaped hollow structure and curve the rectangular-shaped hollow structure. When the claw of the claw structure imparts pressure on the rectangular-shaped hollow structure, the strain gauge distorts, following the curve of the rectangular-shaped hollow structure, to produce corresponding pointing signals.

It is an advantage of the present invention that the claw structure disposed on the rectangular-shaped hollow structure is better able to distort the rectangular-shaped hollow structure. This improved distortion leads to greater deformation of the strain gauges, and thus improves the overall sensitivity of the pointing stick device.

These and other objectives of the present invention will no doubt become clear to one skilled in the art after reading the detailed description of the preferred embodiment, which is illustrated in the following figures.

DETAILED DESCRIPTION OF THE INVENTION

Figure 3:
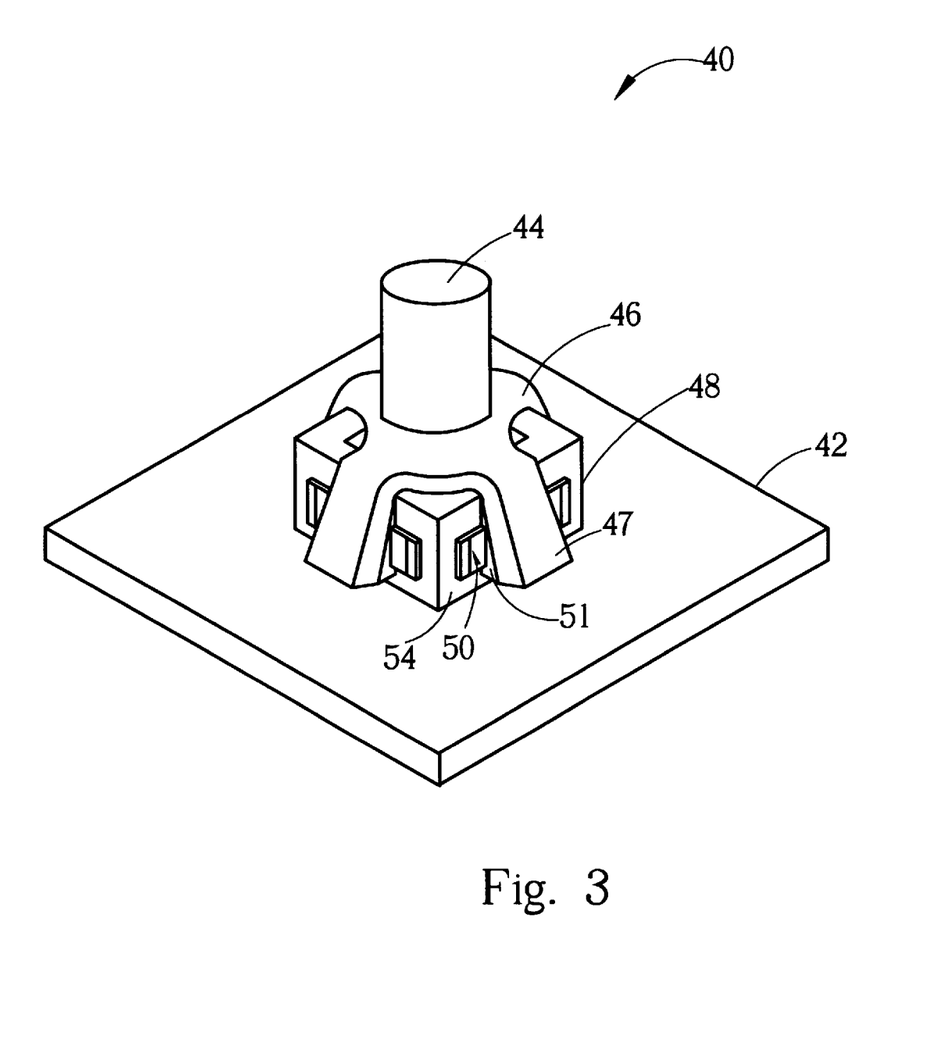
FIG. 3 is a perspective view of a first embodiment pointing stick of the present invention.
Figure 4:
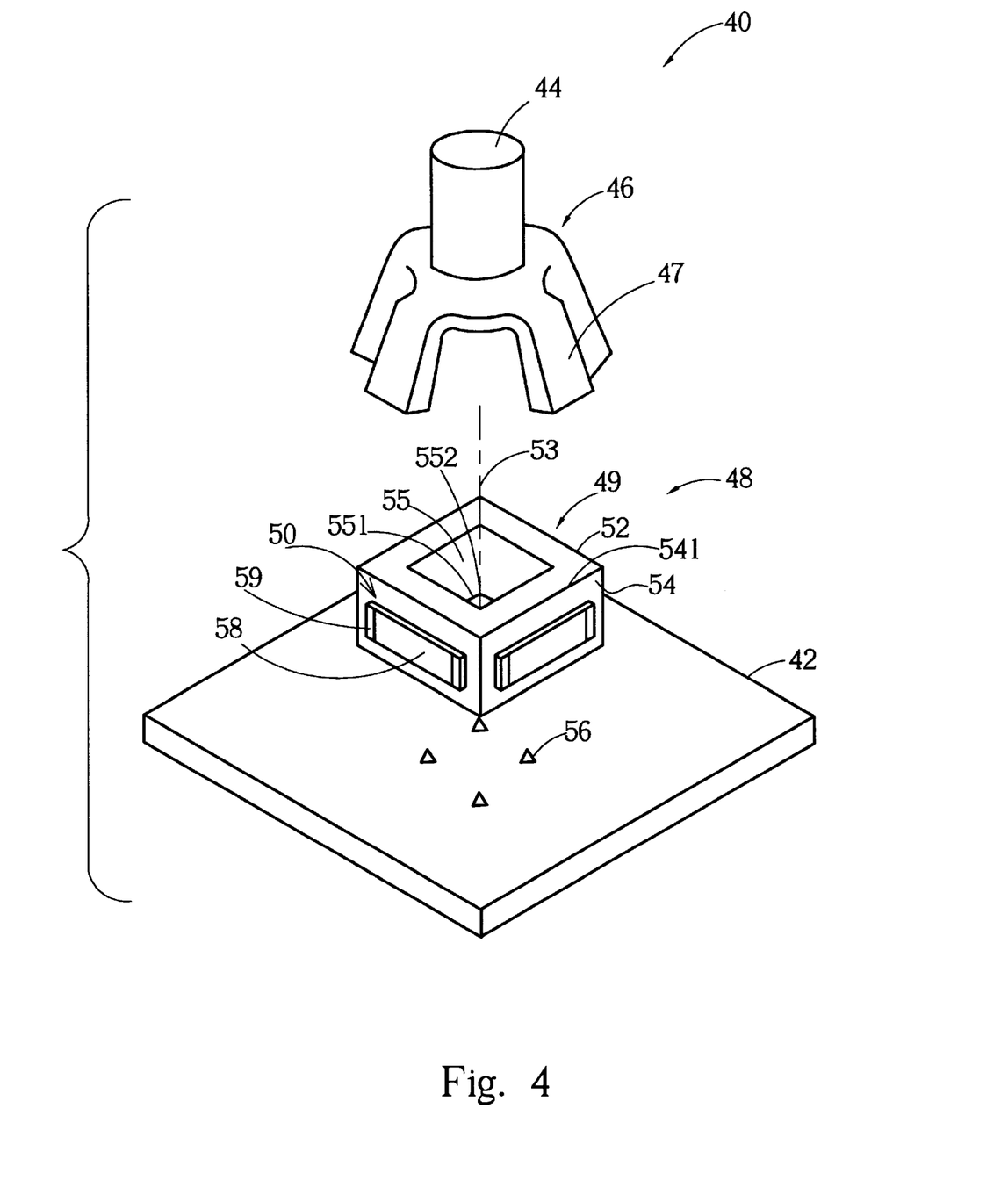
FIG. 4 is an exploded view of the devices in the pointing stick of FIG. 3.

Please refer to FIG. 3 and FIG. 4. FIG. 3 is a perspective view of a first embodiment pointing stick 40 of the present invention. FIG. 4 is an exploded view of the pointing stick 40. The pointing stick 40 comprises a substrate 42, a pole 44, a claw structure 46, a rectangular-shaped hollow structure 48, and four strain gauges 50 installed on the rectangular-shaped hollow structure 48. The substrate 42 can be made of metal or plastic, such as a printed circuit board.

The rectangular-shaped hollow structure 48 comprises a plate 49 that encircles a central axis 53 perpendicular to the substrate 42. The rectangular-shaped hollow structure 48 is installed on the substrate 42. The rectangular-shaped hollow structure 48 is a hollow structure with a rectangular shape, which comprises four connecting rectangular slabs 52, each containing an outside surface 54 and an inside surface 55. Each outside surface 54 has an upper margin 541. Each inside surface 55 has a lower margin 551. The strain gauges 50 are installed on the outside surfaces 54.

Each strain gauge 50 comprises a strip pressure resistor 58 and two electrodes 59 installed on either end of the pressure resistor 58. The pressure resistor 58 distorts according to an imposed pressure, and changes its resistance accordingly.

The claw structure 46 is positioned on the rectangular-shaped hollow structure 48 and the pole 44 is installed on the top of the claw structure 46. The claw structure 46 comprises four claws 47 installed outside of four slabs 52, respectively. Each claw 47 connects to a central portion of the upper margin 541 on the outside surface 54 to impart a pressure on the strain gauges 50 and the respective rectangular slab 52 of the rectangular-shaped hollow structure 48. This induces the strain gauges 50 to produce corresponding pointing signals. An adhesive layer 51 is applied between each claw 47 and its respective strain gauge 50.

There are four connecting points 56 installed between the rectangular-shaped hollow structure 48 and the substrate 42 at corner locations of the lower margin 551 on the inside surface 55. That is, the four connecting points 56 are on the four ends 552 on the inner side of the rectangular-shaped hollow structure 48. The connecting points 56 are for fixing the rectangular-shaped hollow structure 48 onto the substrate 42.

Figure 5:
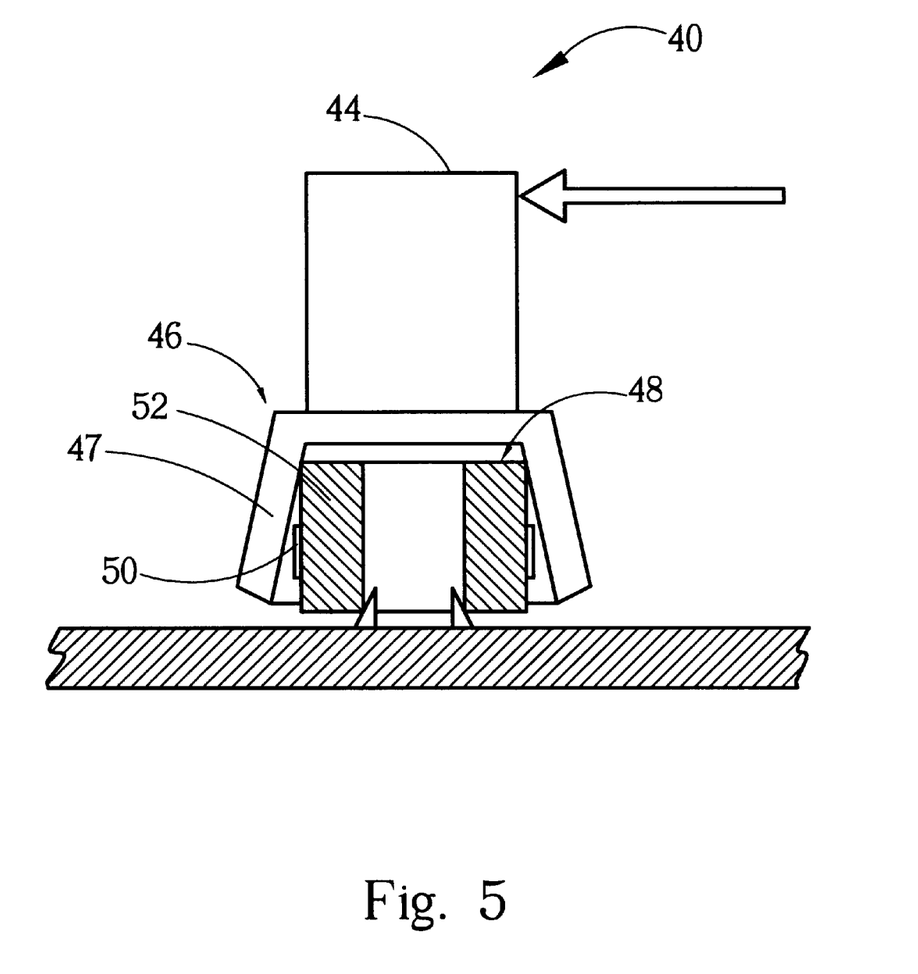
FIG. 5 is a schematic view of the pointing stick in FIG. 3 being pushed in a horizontal direction.
Figure 6:
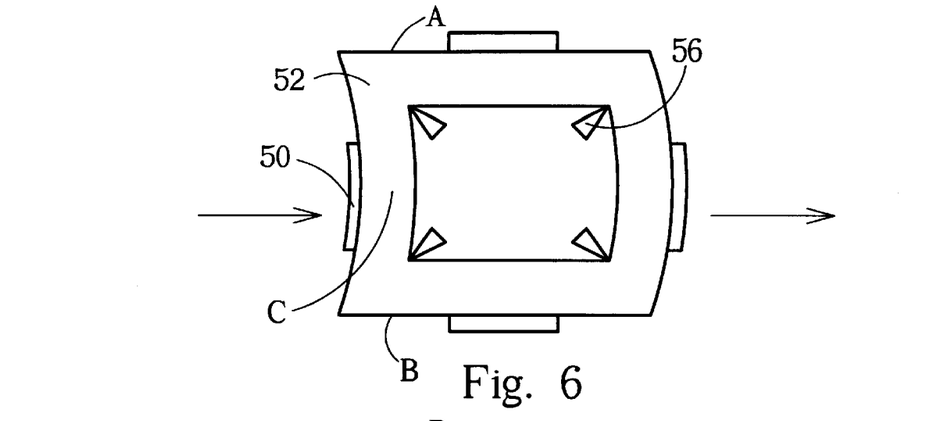
FIG. 6 to FIG. 8 are the top, side and front views of a rectangular-shaped hollow structure in FIG. 5 under pressure, respectively.
Figure 7:
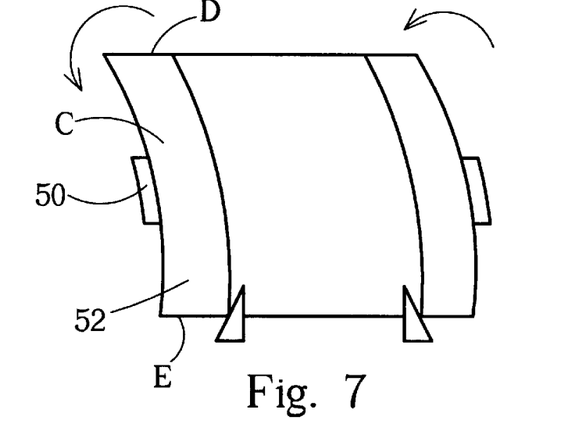
Figure 8:
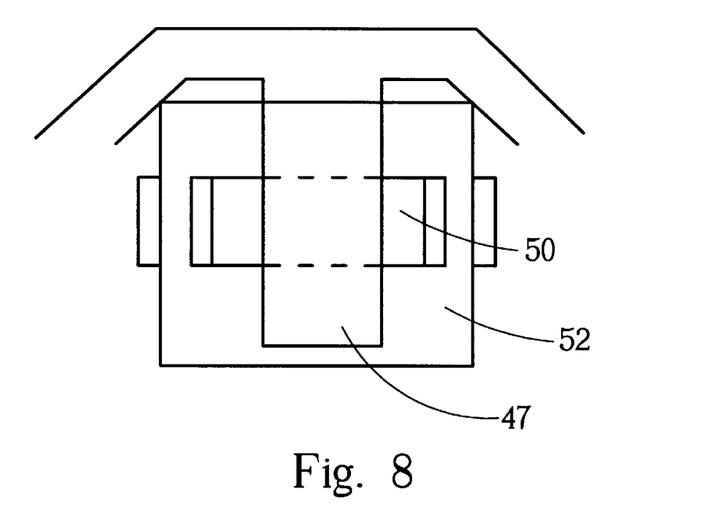

Please refer to FIG. 5 through FIG. 8. FIG. 5 is a schematic view of the pointing stick 40 being pushed in a horizontal direction. FIG. 6 through FIG. 8 are top, side and front views of the rectangular-shaped hollow structure 48 under pressure, respectively. As shown in FIG. 5, when a user pushes the pole 44, the claws 47 of the claw structure 46 impart a pressure on the strain gauges 50 and produce a corresponding distortion of the rectangular slabs 52 of the rectangular-shaped hollow structure 48.

As shown in FIG. 6, the rectangular slabs 52 have a left side A, a right side B and a central portion C. When the pole 44 is pushed, the claws 47 will impart a corresponding pressure on the slabs 52. For a slab 52 under this pressure, the left and right sides A and B are fixed by the connecting points 56, while the central portion C distorts due to the force. That is, the left and right sides A and B of the slab 52 bend toward the central portion C. The strain gauges 50 thus distort, following the bending of their respective slabs 52 and generate corresponding pointing signals.

Referring to FIG. 7, the slabs 52 also have an upper side D and a lower side E. When the pole 44 is pushed, a claw 47 of the claw structure imparts a corresponding pressure on a rectangular slab 52, causing the central portion C to curve while the lower side E is fixed by the connecting points 56. That is, the upper side D and the lower side E curve toward the central portion C. The strain gauge 50 distorts, following the curve of the rectangular slab 52, to produce the corresponding pointing signals.

With reference to FIG. 8, when the claw 47 imparts the corresponding pressure to the strain gauge 50 on the rectangular slab 52, the strain gauge 50 will also produce the corresponding pointing signals in response to the pressure imparted by the claw 47.

Therefore, the strain gauge 50 of the pointing stick 40 will produce corresponding pointing signals in response to the distortion of the rectangular slab 52 in two directions and the pressure that the claw 47 directly imparts thereon.

Figure 9:
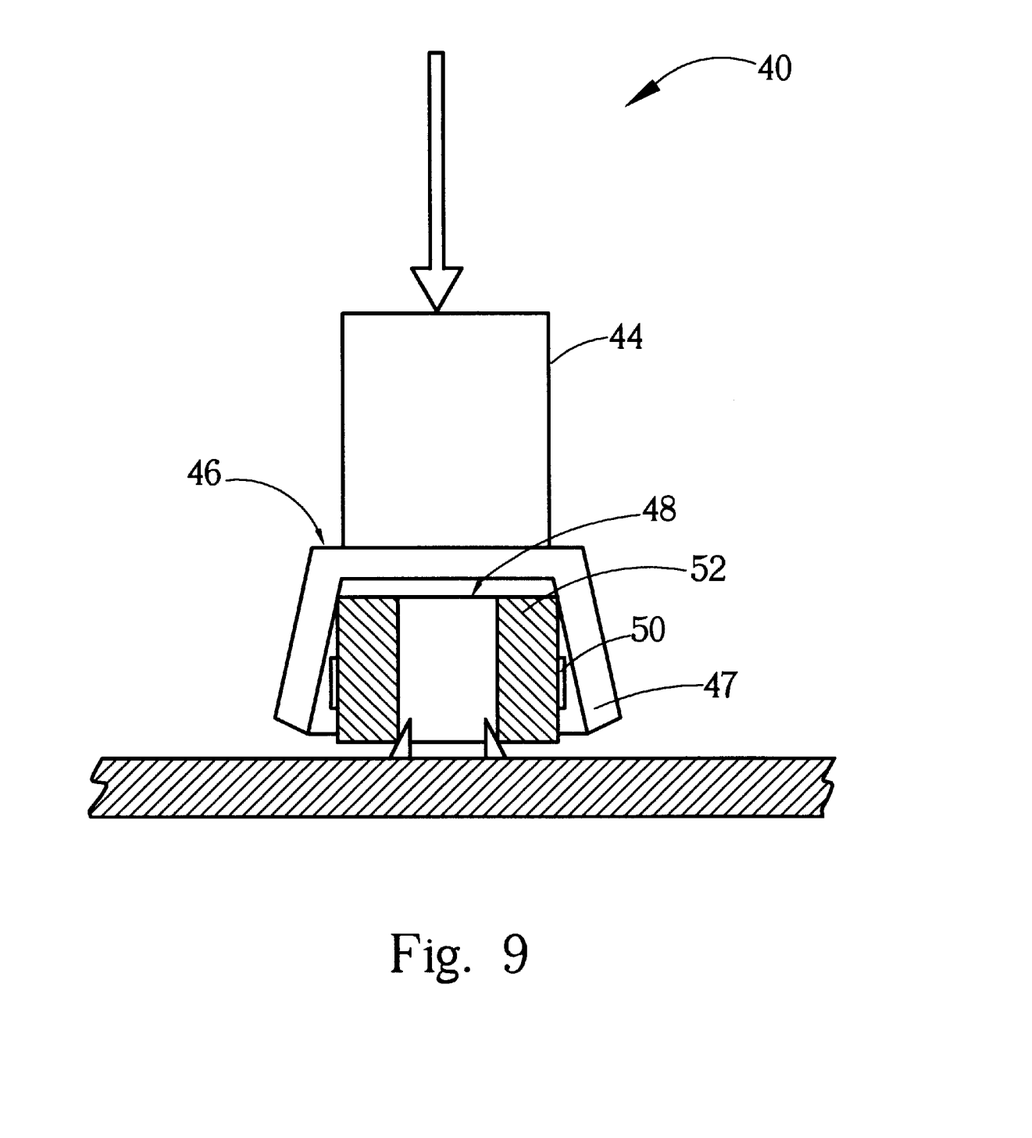
FIG. 9 is a schematic view of the pointing stick in FIG. 3 being pushed downwards.
Figure 10:
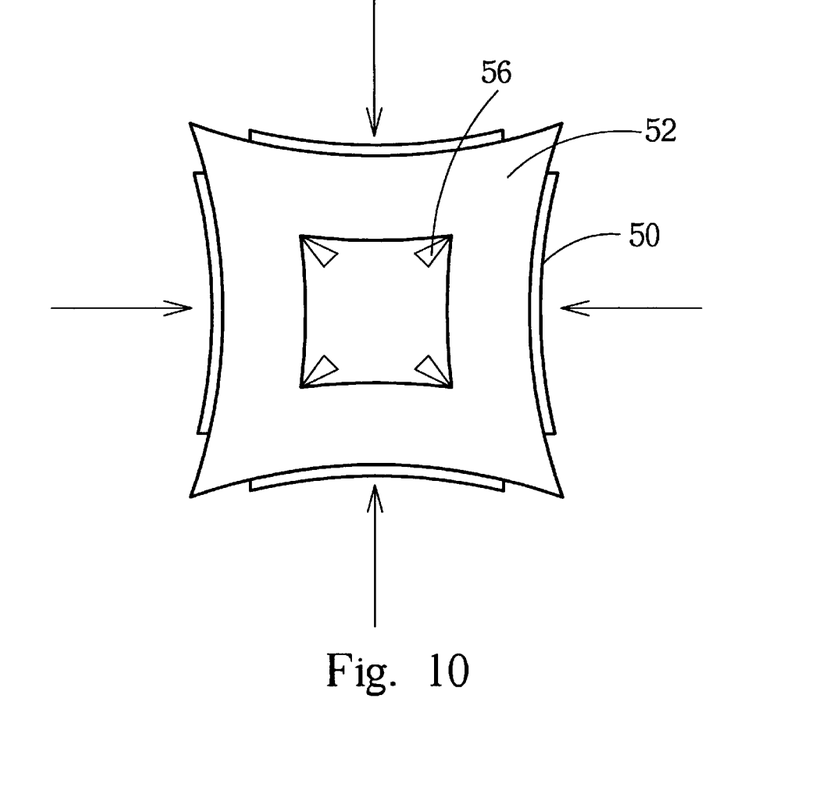
FIG. 10 and FIG. 11 are top and side views of a rectangular-shaped hollow structure in FIG. 9 under pressure, respectively.
Figure 11:
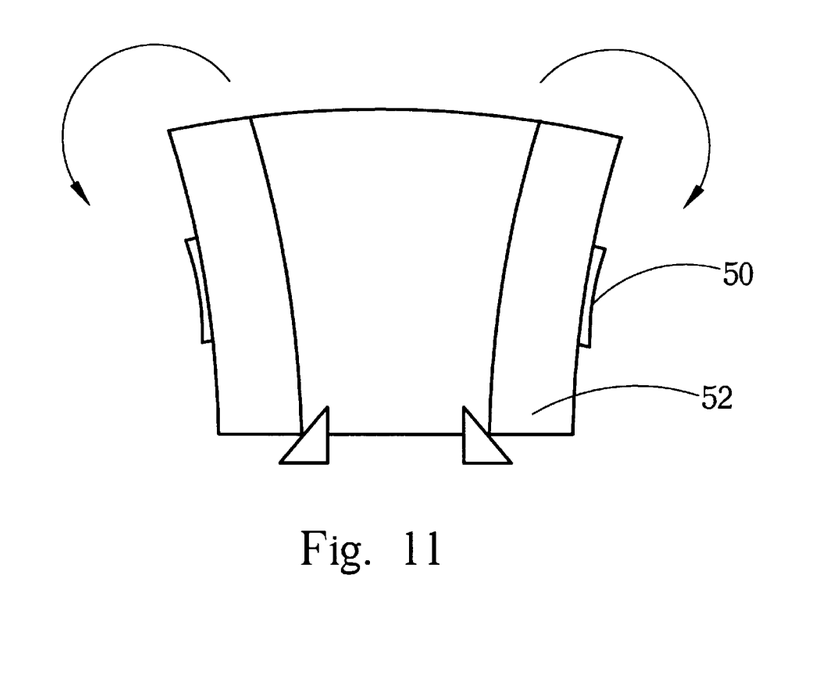

Please refer to FIG. 9 through FIG. 11. FIG. 9 is a schematic view of the pointing stick 40 in FIG. 3 being pushed downwards. FIG. 10 and FIG. 11 are top and side views of the rectangular-shaped hollow structure 48 under pressure, respectively. When the user presses in a downward manner upon the pole 44, the strain gauge 50 will also output the corresponding pointing signals in response to the above-mentioned three reasons. As shown in FIG. 10, when the claw 47 imparts a pressure on the four slabs 52, the slabs 52 will bend towards the inside of the hollow structure 48. This induces the strain gauge 50 to produce corresponding pointing signals. Referring to FIG. 11, when the claws 47 impart a pressure on the slabs 52, the slabs 52 bend down and the strain gauges 50 produce the corresponding pointing signals. Furthermore, when the claw 47 imparts a pressure to the strain gauge 50 on the slab 52, the strain gauge 50 will produce the corresponding pointing signals in response to the pressure that the claw 47 imparts directly thereon. This is similar to what is shown in FIG. 8.

Figure 12:
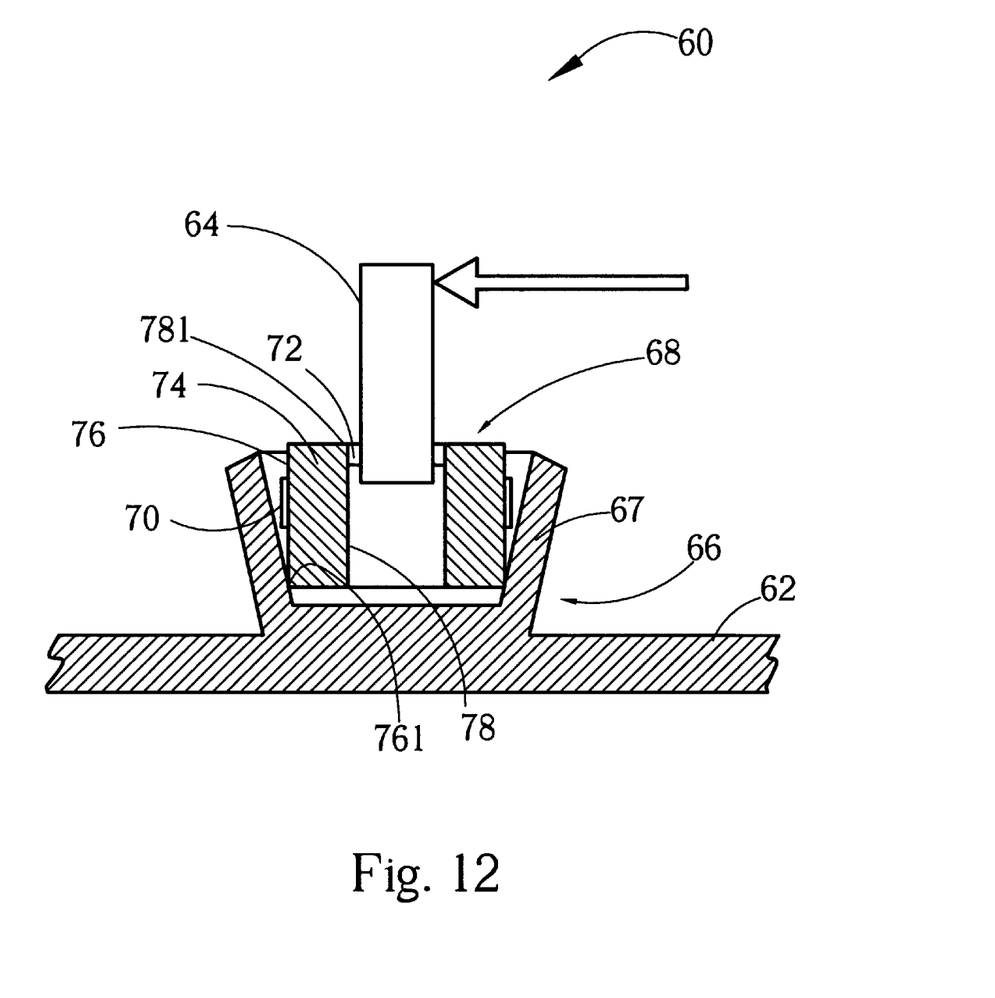
FIG. 12 is a schematic view of a second embodiment pointing stick of the present invention.

Please refer to FIG. 12. FIG. 12 is a schematic view of a second embodiment pointing stick 60 of the present invention. The main difference between the pointing stick 60 and the pointing stick 40 is the arrangement of the relative positions of all devices. The pointing stick 60 comprises a substrate 62, a pole 64, a claw structure 66, a rectangular-shaped hollow structure 68 and four strain gauges 70 installed on the rectangular-shaped hollow structure 68.

For the pointing stick 60, the claw structure 66 is installed on the substrate 62. The rectangular-shaped hollow structure 68 is installed on the claw structure 66. The pole 64 is installed on the rectangular-shaped hollow structure 68. The pointing stick 60 comprises four connecting points 72 installed between the rectangular-shaped hollow structure 68 and the pole 64, positioned on the four ends of the inner side of the rectangular-shaped hollow structure 68, respectively, for fixing the pole 64 onto the rectangular-shaped hollow structure 68.

Each slab 74 of the rectangular-shaped hollow structure 68 comprises an outside surface 76 and an inside surface 78. The outside surface 76 contains a lower margin 761 and the inside surface 78 contains an upper margin 781. The claw 67 of the claw structure 66 connects to the lower margin 761 of the outside surface 76. The four connecting points 72 are positioned between the upper margin 781 of the inside surface 78 and the pole 64. When the user pushes the pole 64 sideways or downward, the claw 67 of the claw structure 66 will impart a pressure to the strain gauges 70 and the slabs 74. The strain gauges 70 will then distort in response to the above-mentioned three reasons to output the corresponding pointing signals.

In comparison with the prior art pointing stick device 10, the pointing sticks 40, 60 disclosed herein have rectangular-shaped hollow structures 48, 68 and claw structures 46, 66. The strain gauges 50, 70 distort and output corresponding pointing signals in response to the bending of the rectangular slabs 52, 74 in two directions, as well as to the pressure that the claws 47, 67 directly impart thereon.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing stick device comprising:
   a substrate;
   a rectangular-shaped hollow structure installed on the substrate and having a central axis substantially vertical to the substrate;
   at least one strain gauge installed on the rectangular-shaped hollow structure; and
   a claw structure having at least one claw, the claw structure being used to impart a pressure onto the rectangular-shaped hollow structure and curve the rectangular-shaped hollow structure, wherein the claw structure is located above the rectangular-shaped hollow structure and a pole is fixed to an upper side of the claw structure;
   wherein when the claw of the claw structure imparts pressure on the rectangular-shaped hollow structure, the strain gauge distorts, following the curve of the rectangular-shaped hollow structure, to produce corresponding pointing signals; and wherein when the pole is pushed, the claw of the claw structure imparts the pressure on the rectangular-shaped hollow structure to cause the strain gauge to produce the corresponding pointing signals.

2. The pointing stick device of claim 1 further comprising a plurality of connecting points installed between the rectangular-shaped hollow structure and the substrate to fix the rectangular-shaped hollow structure on the substrate.

3. The pointing stick device of claim 2 wherein the rectangular-shaped hollow structure comprises at least one rectangular slab, the rectangular slab having a left side, a right side, a central portion, and an outside surface, the strain gauge is installed on the outside surface, the claw of the claw structure installed outside the central portion, and two of the plurality of connecting points are located on the left side and the right side of the rectangular slab; wherein when the pole is pushed, the claw of the claw structure imparts the corresponding pressure on the rectangular slab, causing the left side and the right side to curve towards the central portion of the rectangular slab, the strain gauge distorting with the curve of the rectangular slab to produce the corresponding pointing signals.

4. The pointing stick device of claim 3 wherein the rectangular slab further comprises an upper side, a lower side, and an inside surface corresponding to the outside surface, the outside surface having an upper margin, and the inside surface having a lower margin, the claw of the claw structure connecting with the upper margin of the outside surface, and the two connecting points located on the lower margin of the inside surface; wherein when the pole is pushed, the claw of the claw structure imparts the corresponding pressure on the rectangular slab, causing the upper side and the lower side to curve toward the central portion of the rectangular slab, and the strain gauge distorts, following the curve of the rectangular slab, to produce the corresponding pointing signals.

5. A pointing stick device comprising:
   a substrate;
   a claw structure fixed on the substrate and having at least one claw;
   a rectangular-shaped hollow structure installed on the claw structure and having a central axis substantially vertical to the substrate;
   a pole installed on the rectangular-shaped hollow structure;
   a plurality of connecting points installed between the rectangular-shaped hollow structure and the pole to fix the pole on the rectangular-shaped hollow structure; and
   at least one strain gauge installed on the rectangular-shaped hollow structure;
   wherein when the pole is pushed, the claw of the claw structure imparts pressure on the rectangular-shaped hollow structure, the strain gauge distorts, following the curve of the rectangular-shaped hollow structure, to produce corresponding pointing signals.

6. The pointing stick device of claim 5 wherein the rectangular-shaped hollow structure comprises at least one rectangular slab having a left side, a right side, a central portion, and an outside surface, the strain gauge installed on the outside surface, the claw of the claw structure installed outside the central portion, and two of the connecting points are located on the left side and the right side of the slab; wherein the claw of the claw structure imparts the pressure on the rectangular slab, causing the left side and the right side of the rectangular slab to curve towards the central portion when the pole is pushed, and the strain gauge distorts, following the curve of the rectangular slab, to produce the corresponding pointing signals.

7. The pointing stick device of claim 6 wherein the rectangular slab further comprises an upper side, a lower side, and an inside surface corresponding to the outside surface, the outside surface having a lower margin, the inside surface having an upper margin, the claw connecting with the lower margin of the outside surface, and the two connecting points located on the upper margin; wherein the claw of the claw structure imparts the corresponding pressure on the rectangular slab when the pole is pushed, causing the upper side and the lower side of the rectangular slab to curve towards the central portion, and the strain gauge distorts, following the curve of the rectangular slab, to produce the corresponding pointing signals.

\* \* \* \* \*